US012623905B2

(12) United States Patent
Kumar et al.

(10) Patent No.: US 12,623,905 B2
(45) Date of Patent: May 12, 2026

(54) CRYOGENIC PROCESS FOR CRUDE HELIUM RECOVERY FROM NATURAL GAS

(71) Applicants: COUNCIL OF SCIENTIFIC & INDUSTRIAL RESEARCH, New Delhi (IN); ONGC Energy Centre Trust (OECT), Delhi (IN)

(72) Inventors: Sunil Kumar, Dehradun (IN); Avinash S. Mhetre, Dehradun (IN); Ojasvi Sharma, Dehradun (IN); Swapnil Diveker, Dehradun (IN); Soumen Dasgupta, Dehradun (IN); Manoj Srivastava, Dehradun (IN); Anjan Ray, Dehradun (IN); Aarti Arya, Dehradun (IN); Prasenjit Ghosh, Dehradun (IN); Bharat S. Mendhe, Delhi (IN); Nammi Ramya, Delhi (IN)

(73) Assignees: COUNCIL OF SCIENTIFIC & INDUSTRIAL RESEARCH, New Delhi (IN); ONGC Energy Centre Trust (OECT), Delhi (IN)

( * ) Notice: Subject to any disclaimer, the term of this patent is extended or adjusted under 35 U.S.C. 154(b) by 275 days.

(21) Appl. No.: 18/329,151

(22) Filed: Jun. 5, 2023

(65) Prior Publication Data

US 2023/0391621 A1     Dec. 7, 2023

(30) Foreign Application Priority Data

Jun. 6, 2022   (IN) .............................. 202211032467

(51) Int. Cl.
| | |
|---|---|
| *C01B 23/00* | (2006.01) |
| *F25J 3/02* | (2006.01) |
| *F25J 3/06* | (2006.01) |

(52) U.S. Cl.
CPC ......... C01B 23/0036 (2013.01); F25J 3/0233 (2013.01); F25J 3/069 (2013.01);
(Continued)

(58) Field of Classification Search
CPC ........ C01B 23/0036; C01B 2210/0009; C01B 2210/0031; F25J 3/069; F25J 3/0209;
(Continued)

(56) References Cited

U.S. PATENT DOCUMENTS

| | | | | | |
|---|---|---|---|---|---|
| 3,130,027 | A | * | 4/1964 | Harper ..................... | F25J 3/069 95/24 |
| 3,324,626 | A | * | 6/1967 | Yarbrough ............... | F25J 3/029 95/53 |

(Continued)

FOREIGN PATENT DOCUMENTS

| | | |
|---|---|---|
| CN | 113670002 A | 11/2021 |
| CN | 113735080 A | 12/2021 |

(Continued)

OTHER PUBLICATIONS

Chaudhuri, H., et al., "The Enigma of Helium," Acta Geod. Geoph. Hung., vol. 45(4), pp. 452-470, Dec. 2010.
Das, N.K., et al., "Extraction of Helium From Natural Gas," Nuclear India, vol. 41, No. 09-10, Mar.-Apr. 2008, 2 pages.

*Primary Examiner* — Joel M Attey
*Assistant Examiner* — Ibrahim A. Michael Adeniji
(74) *Attorney, Agent, or Firm* — Christensen O'Connor Johnson Kindness PLLC

(57)     ABSTRACT

The present invention relates to a cryogenic process to produce crude helium from pretreated natural gas. The pretreated natural gas is processed in two flash stages using the helium free process stream as a stripping agent, and a distillation column with the identified operating conditions and process scheme to ensure 100% helium recovery with reduced capital and operating cost for producing the crude (Continued)

helium. The integration of the cryogenic process with the already known purification system to produce pure helium is demonstrated to ensure high helium recovery in a hybrid process.

10 Claims, 2 Drawing Sheets

(52) U.S. Cl.
CPC .................. *C01B 2210/0009* (2013.01); *C01B 2210/0031* (2013.01); *F25J 3/0209* (2013.01); *F25J 3/0238* (2013.01); *F25J 3/029* (2013.01); *F25J 2200/70* (2013.01); *F25J 2200/74* (2013.01); *F25J 2205/02* (2013.01); *F25J 2205/04* (2013.01); *F25J 2215/30* (2013.01); *F25J 2270/12* (2013.01)

(58) Field of Classification Search
CPC .......... F25J 3/0233; F25J 3/0238; F25J 3/029; F25J 2200/70; F25J 2200/74; F25J 2205/02; F25J 2205/04; F25J 2215/30; F25J 2270/12
USPC .......................... 62/639, 612; 55/482; 96/134
See application file for complete search history.

(56) References Cited

U.S. PATENT DOCUMENTS

| 3,653,220 | A | | 4/1972 | Foster et al. | |
| 3,719,053 | A | * | 3/1973 | De Marco | F25J 3/08 |
| | | | | | 62/639 |
| 4,701,200 | A | | 10/1987 | Fisher et al. | |
| 4,701,201 | A | | 10/1987 | Hanson et al. | |
| 5,017,204 | A | | 5/1991 | Gottier et al. | |
| 5,224,350 | A | * | 7/1993 | Mehra | C01B 23/0094 |
| | | | | | 95/94 |
| 6,070,429 | A | * | 6/2000 | Low | F25J 1/0284 |
| | | | | | 62/619 |
| 10,215,488 | B2 | | 2/2019 | White et al. | |
| 2014/0033764 | A1 | * | 2/2014 | Higginbotham | F25J 3/067 |
| | | | | | 62/639 |
| 2020/0088465 | A1 | * | 3/2020 | White | F25J 3/029 |

FOREIGN PATENT DOCUMENTS

| IN | 62/CHE/2007 | B | 11/2008 |
| WO | 88/08948 | A1 | 11/1988 |
| WO | 2010/060533 | A1 | 6/2010 |
| WO | 2013015907 | A1 | 1/2013 |
| WO | 2016130243 | A1 | 8/2016 |

* cited by examiner

CRYOGENIC PROCESS FOR CRUDE HELIUM RECOVERY FROM NATURAL GAS

FIELD OF THE INVENTION

The present invention relates to a cryogenic process for crude helium recovery from natural gas. More particularly, the present invention relates to the processing scheme of a cryogenic process for natural gas to produce the crude helium with 100% helium recovery and to enhance helium recovery by minimizing the helium loss in a hybrid process consisting of the cryogenic process of the present invention and a known purification system, with reduced helium production capital and operating costs.

BACKGROUND OF THE INVENTION

Helium is a unique gas with a wide range of important medical, scientific and industrial applications based on helium's extremely low boiling temperature, inert and non-flammable nature and small molecular size. Most of the helium is produced from Natural Gas (NG). With the increasing world's demand for helium, the value of NG fields, even with very small helium content, is likely to rise significantly if the helium can be recovered efficiently. The vol % of helium present in the natural petroleum gases in India is very low (~0.05 vol %) than that of the USA, Poland, and Russia (3.00-7.00 vol %), which are treated as global suppliers of helium (Chaudhuri et al., 2010). Despite low helium content, the large volume availability of NG makes it the most potential and practical source for helium production in (Nisith K. Das, R. K. Bhandari, 2020).

The major components in the natural gases are nitrogen and methane, higher hydrocarbons, carbon dioxide, moisture, along with helium. Most of the process for helium recovery from natural gas includes NG pretreatment step for impurities (water vapour, $CO_2$, water, $H_2S$, higher hydrocarbon, etc) removal followed by helium up-gradation step through nitrogen and hydrocarbon rejection and subsequent purification step to produce the pure helium. Most of the potential reported processes for helium up-gradation step to produce crude helium are either standalone cryogenic or a combination of cryogenic and PSA or cryogenic and membrane or membrane and PSA or their combinations. PSA is the most frequently used process for the purification of crude helium from NG to produce helium with a purity of more than 99.0% helium.

The literature on helium production from natural gas revealed that cryogenic processes are one of the most processes used to produce crude helium from natural gas. PSA is suggested as the most widely used process for purifying crude helium to produce pure helium. Various cryogenic processes for producing crude helium from natural gas have been reported [Indian Patent No. IN237264, International patent Publication No. WO2013/015907A, United State patent No. U.S. Pat. No. 10,215,488B2, International patent Publication No WO2010/060533A1, International patent Publication No WO2016/130243A1. International patent Publication No. WO1988/008948A1, U.S. Pat. No. 3,653,220A, China State patent No. CN113735080A. United State patent No. U.S. Pat. No. 4,701,201A, United State patent No. U.S. Pat. No. 4,701, 200A, China State patent No. CN113670002, United State patent No. U.S. Pat. No. 5,017,204]. The brief of processes reported in prior arts is described below.

Reference may be made to Indian patent IN237264, wherein the natural gas comprising of helium (0.043%), methane (95.4%) and nitrogen (2.1%) and available at 58.6 bars and 22° C. is cooled in a heat exchanger using external cold utility and fed to a two-phase separator to generate vapour stream and a liquid stream disclosed. The vapour stream is further cooled and processed to generate the crude helium and liquid streams, further processed to generate the LNG and methane-rich gas for the generation of syngas. The helium recovery in crude helium in the examples of the proposed process is around 87-88%. The produced crude helium contains 46.8-63.35% helium, 29.9-45.8% nitrogen and 6.72-7.8% methane.

Reference may be made to patent Application Publication No. WO2013/015907A1, wherein the compressed natural gas stream is passed through a cold box to condense liquids and the purification section to remove the impurities disclosed. The cooled gas comprising of methane (69.8%), nitrogen (28.1%) and helium (2.16%), and available at a temperature of −101.9° C. and pressure of ~40 bars, is routed to a cryogenic stripper column. A raw helium product is removed from the top of the cryogenic stripper column, and the liquid product stream from the bottom. The liquid product stream may include a low BTU natural gas, which may be used to generate electrical power by its burning. The produced crude helium contains helium of 21.96-48.4%, methane of 2.2-28.9%, nitrogen of 49.1-49.4%.

Reference may be made to US patent No. U.S. Pat. No. 10,215,488B2, wherein helium can be recovered from nitrogen-rich natural gas at high pressure with low helium loss by cryogenic distillation of the natural gas after pretreatment of the gas to remove incompatible impurities and then recovery of natural gas liquid (NGL) from the pretreated gas by distillation described. The pretreated natural gas consisting of methane (5.0%), nitrogen (93%), helium: (2%) and available at high pressure of 30-50 bars is processed to produce a helium-rich stream of 90% helium purity using the cryogenic distillation and nitrogen-rich product stream expansion using expender to generate the very low temperature up to −191° C. with small loss of helium. The process enables specific power for liquid production using a warm and cold expander system to provide refrigeration more efficiently than a single expander. The power to recompress the product stream to the feed pressure of 30 bars is 2899 kW.

Reference may be made to International patent Publication No. WO2010/060533A1, wherein process reveals helium recovery from a gas stream consisting of substantially of carbon dioxide, helium, methane and higher hydrocarbons. Feed gas is pretreated to remove the carbon dioxide. The pretreated feed gas is processed in the cryogenic section to remove nitrogen, methane and higher hydrocarbons. The helium-rich fraction is fed to adsorption separation to produce a helium-rich product fraction. The detail of operational schemes and operating conditions of the cryogenic section are not disclosed in this invention. The process provides product fraction with a high amount of helium (at least 30, preferably 50 vol. %), less amount of energy, machine and/or investment cost.

Reference may be made to International Patent Application Publication No. WO2016/130243A1 discloses integrated apparatus for recovery of a helium-rich stream and a hydrogen-rich stream from a mixed gas containing 10-80 volume percent hydrogen. 0.1-5.0 volume percent helium, and the balance being higher-boiling components. The higher-boiling component may include nitrogen, methane, argon, and carbon monoxide or C2+hydrocarbon. The process includes a cryogenic air separation unit in combination with at least one hydrogen transport membrane. Helium rich product stream having about 80% or higher helium content by volume can be produced using the process of this invention. In the invention demonstration example, the feed gas is compressed to 34.5 bars and processed using a cryogenic section and hydrogen transport membrane to produce helium of 81% which is subjected to a purification section which may be PSA.

Reference may be made to International Patent Application Publication No. WO1988/008948A1, wherein cryogenically separating a helium-bearing natural gas in which process-derived streams using indirect heat exchangers and streams throttling are utilized to effect cooling of the natural gas streams to temperatures in the cryogenic range and avoid any external cooling system requirement like refrigeration system for generating the cold utilities described. Compressed NG having pressure in the range of 27-272 bars is processed in the process of the present invention. The produced crude helium contains helium purity of more than 50%. Nitrogen is major, and methane is a minor component in the produced crude helium. There is no example in the patent application to demonstrate the invention for producing crude helium. The invention emphasis is to eliminate the need for external refrigeration means to achieve the cryogenic temperature in the process.

Reference may be made to United State patent No. U.S. Pat. No. 3,653,220A, in which the high pressure (102 bars) natural gas consisting of approximately 22% $CO_2$, 15% $CH_4$, 54% $N_2$ and 6.5% helium is pretreated to remove the $CO_2$. The treated gas is cooled for partial condensation. Cooled gas's liquid and gas parts are separated using a flash stage. The vapour from the flash stage is further cooled and routed to another flash stage. The vapour from the second flash stage consists of 80-85% helium, with the remainder consisting of mainly nitrogen and a small amount of hydrocarbons and various impurities. At this concentration of helium, gas is commonly known as crude helium. The crude helium is either routed to storage or to further purification to produce pure helium. The principal objective of the invention was to provide an improved, simplified and economical process and apparatus requiring minimal plant equipment and supervision for the recovery of helium from helium-bearing natural gas. Another object was to provide a helium recovery process with an improved, economical, simplified moisture and $CO_2$ gas separating system utilizing $CO_2$-free waste gases derived from the process for cyclic renewal of drying and $CO_2$. The person skilled in the art can understand that there are high chances of helium solubility in the liquid of the flash stage used to generate the crude helium due to very low temperature and high pressure operating conditions which may lead to helium loss with other products streams. There is no example to demonstrate the proposed invention in the patent invention.

Reference may be made to Chinese patent No. CN113735080A for extracting ultra-pure helium from helium-containing natural. The method comprises the technologies of desulfurization and decarburization, gas membrane separation, pressure swing adsorption and low-temperature catalysis. The feed gas is treated by a desulfurization and decarburization system and then enters a primary membrane separation system. The helium-rich gas, after membrane separation, enters a primary low-temperature catalytic system to remove hydrogen components in the helium-rich gas.

The dehydrogenated helium-rich gas enters a secondary gas membrane separation system. The helium-rich gas with higher helium concentration is sent to a primary pressure swing adsorption (PSA) system. The obtained pure helium enters a secondary low-temperature catalytic system to remove trace hydrogen. The dehydrogenated helium enters a secondary PSA to produce ultra pure helium gas.

Reference may be made to United State patent No. U.S. Pat. No. 4,701,201A, wherein NG is cooled using a process heat exchanger and then expended using the throttling valve to reduce its temperature further. The cooled gas is processed in the distillation column to produce crude helium. Crude helium can be purified using the warm process preferentially PSA to produce pure helium. The NG feed consists of 1.7% helium, 41.1% N2. 57.2% available at a pressure of 68.4 bars and temperature of $-12°$ C. is used in the example used to demonstrate the invention for the production of crude helium consisting of 37.2% helium, 62.7% $N_2$ and 0.1% methane. The helium recovery of the disclosed process is ~91% for producing crude helium and 64% for pure helium. It may also be noted that since the cooling effect in the proposed process is generated using the feed throttling thus, the high pressure of the feed is required to use this process to produce crude helium or compression of low-pressure feed.

Reference may be made to United State patent No. U.S. Pat. No. 4,701,200A, wherein similar process disclosed in United State patent No. U.S. Pat. No. 4,701,201A (D14). In the process, additional steps (cooling and separation) are added to the process to generate crude helium disclosed in United State patent No. U.S. Pat. No. 4,701,201A to increase the purity of crude helium to 86.5% from 40.7%. PSA is proposed in this process scheme to process the crude helium to generate the pure helium of 99.99%. The estimated helium recovery is ~88.9% for producing pure helium using the process example disclosed in this Patent.

Reference may be made to Chinese patent No. CN113670002, wherein two flash stages and two distillation columns to produce the crude helium from a pressurized (~45 bars) feed gas mixture containing helium (0.5%), methane (87.699%), nitrogen (10%) and $CO_2$ (0.001%) and other hydrocarbons disclosed. The feed gas is cooled and routed to the first separator to separate uncondensed gas and condensed liquid. The uncondensed gas separated from the separator is further cooled and then entered into a cryogenic separator. The gas phase separated by the low-temperature separator is cooled and depressurized in the main cooling box and then enters the top of the helium concentration tower, and the liquid phase separated by the low-temperature separator is depressurized and then enters the middle of the helium concentration tower. The top vapour from the helium concentration tower is further cooled and processed in the helium recovery tower. The top of the helium recovery tower represents a crude helium product. The process produces crude helium of 73.476% purity with helium recovery of 98.95%.

A cryogenic process is disclosed in United State patent No. U.S. Pat. No. 5,017,204 for production of a crude helium stream with more than >30 vol % helium purity from pressurized natural gas. The NG consisting of ~0.1% to 0.5% helium is available at a pressure of about 20.5-41 bars. In the process, the pressurized NG feed gas is separated to produce a helium-enriched stream and a helium-lean stream, typically by flashing or stripping or a combination of both. The helium-enriched stream is further upgraded to produce the crude helium product using the dephlegmator heat exchanger and at least one residue gas product stream.

Most of the low-temperature processes (cryogenic) reported in the open literature are focused on the production of liquefied natural gas (LNG) and crude helium of 20-70% purity from pressurized natural gas containing a significant amount of nitrogen in the range of 5-30% after its treatment in nitrogen rejection unit. These processes are designed for processing the high-pressure natural gas helium sources. There is a significant increase in the price and demand of helium with time, whereas helium sources are limited. Thus, helium recovery from low-pressure natural gas resources containing a small concentration of helium (0.02-0.50%) and nitrogen (0.1-5%) with maximum helium recovery is the need of the hour. People skilled in the art can also understand that crude helium flow rate will be around 0.25-1% of the total feed input to the cryogenic process depending upon helium content in the feed gas. This crude helium will be processed in a purification system to produce pure helium. This implies that the hybrid process economics using a cryogenic process for the production of crude helium to produce pure helium production will be greatly governed by the cryogenic process economics. Therefore, it will be a great achievement to develop a cryogenic process that can felicitate the full recovery of helium from low-pressure NG with low capital and operating cost to make helium production economically feasible from low-pressure natural gas having very low helium concentration.

Objectives of the Invention

Accordingly, the main objective of the present invention is to provide a cryogenic process for crude helium recovery from natural gas. More particularly, the present invention relates to the processing scheme of a cryogenic process for natural gas to produce the crude helium with 100% helium recovery and to enhance helium recovery by minimizing the helium loss in a hybrid process consisting of the cryogenic process of the present invention and a known purification system, with reduced helium production capital and operating costs.

Another objective of the present invention is to provide a processing scheme for the cryogenic process based on identified operating conditions to avoid the loss of helium in other cryogenic process product streams and to minimize the operating pressure of major pieces of equipment.

Another objective of the present invention is to provide a processing scheme for the cryogenic process to minimize the loss of helium in the purge stream from the purification system used in the hybrid process based on the cryogenic process of the present invention.

Another objective of the present invention is to provide a processing scheme for the cryogenic process to minimize the loss of helium in the hybrid process due to reduced helium recovery in the purification system because of its disturbing operation and performance.

Another objective of the present invention is to provide a processing scheme for the cryogenic process to produce crude helium at higher pressure to facilitate the operation of the purification process at high pressure to reduce the size and to use a combination of purification processes (membrane or pressure swing adsorption or vacuum swing adsorption or combination of thereof) without crude helium additional compression.

Another objective of the present invention is to provide a processing scheme for the cryogenic process to produce crude helium consisting of helium and nitrogen only.

Another objective of the present invention is to provide a processing scheme for the cryogenic process to produce crude helium with reduced capital and operating costs.

SUMMARY OF THE INVENTION

Accordingly, the present invention provides a cryogenic process to produce crude helium from pretreated natural gas to overcome the disadvantages of existing cryogenic processes and hybrid processes and to meet the objectives of the present invention, wherein said process comprising the steps of:

a) subjecting the pretreated natural gas (1) to a first cooler (E1) for its cooling in the temperature range of minus 70-minus 140° C.;

b) subjecting a partially condensed gas (2) to a throttling device (TD) to reduce its pressure and routing a stream (2A) from the throttling device (TD) to a first flash stage (FSI) or routing the partially condensed gas (2) to the first flash stage (FSI) for generating an uncondensed gas stream (3) and a liquid stream (4);

c) subjecting the uncondensed gas stream (3) for its cooling in a second heat exchanger (E2), which uses a cold process liquid streams (7) and external cold utility (ER1) in the temperature range of minus 100-minus 150° C.;

d) subjecting a second partially condensed gas stream (5) to a second flash stage (FSII), which has 2-6 tray below the feed entry location and use a helium free stripping stream (19) to generate in the second flash stage (FSII) a gas stream (6) and the cold process liquid stream (7);

e) subjecting the gas stream (6) to a multi stream third heat exchanger (E3) for its heating;

f) subjecting a heated gas stream (6A) along a high-pressure purge stream (15D) having pressure in the range of 6-20 bars from a purification system (PS) to a gas compressor (K2) for increasing the combined streams pressure in the range of 20-50 bars;

g) subjecting a pressurized gas stream (8) emanating from the first compressor (K2) to a water or air cooler (E6), subsequently feeding the gas stream (9) emanating from the water or air cooler (E6) to the multi stream third heat exchanger (E3) using either the process cold stream (FIG. 1) or the process cold stream and external utility (FIG. 2), cooling of a stream (10) in a fourth heat exchanger (E5) and then a stream (11) from the fourth heat exchanger (E5) is again routed to the multi-stream third heat exchanger (E3) for its cooling and producing a partially condensed stream (12) having a temperature in the range of minus 80-minus 140° C.;

h) subjecting a partially condensed gas stream (12) emanating from the multi-stream third heat exchanger (E3) to a distillation column (DC) having multiple trays in its stripping and rectification sections and having the process stream and/or external utility coils cooler (E-6) inside the distillation column DC overhead section to generate an in situ liquid for rectification section and/or having a reflux stream (16) at the top tray;

i) cooling a gas stream (13) emanating from the distillation column (DC) in a fifth heat exchanger (E4) for its partial condensation;

j) subjecting a cooled gas stream (14) emanating from the fifth heat exchanger (E4) to a separating vessel (V1) for generating a crude helium (15) and a liquid stream (16) used as a reflux stream in top section of the distillation column DC;

k) recycling a purge stream (15C) having pressure in the range of 1-10 bars from the purification system to a first pressure increasing device (K3) to produce an increased pressure stream (15E), which is further routed to a first gas compressor (K2);

l) recycling a high pressure purge stream (15D) having pressure in the range of 8-20 bars from the purification system to a first gas compressor (K2);

m) splitting the distillation column (DC) bottom liquid stream (17) into two streams (18) and 20;

n) subjecting a stream (18) to a throttling valve/expender (PV1) to generate low-pressure stream (18A), which is routed to the multi-stream third heat exchanger (E3) for its cold recovery;

o) subjecting a stream (20) to a throttling valve/expander (PV2) to generate low-pressure stream (20A), which is routed to a fifth heat exchanger (E4) for its cold recovery;

p) subjecting a stream (20B) either to a cold utility generation system (FIG. 1) or to the multi stream third heat exchanger (E3) (FIG. 2) for its cold recovery;

q) subjecting a stream (7C) from the first heat exchanger (E1), a stream (18B) from the multi stream third heat exchanger (E3), a stream (20B) (FIG. 1) from the fifth heat exchanger (E4), /a stream (20B1) (FIG. 2) from the multi steam third heat exchanger (E3) to a cold utility generation system (CUGS) for recovering their cold;

r) subjecting a stream (20C) to a second pressure increasing device (K4) with or without a stream 7D;

s) subjecting a stream (7E) from the second pressure increasing device K4 to a second gas compressor (K1) for recycling the hydrocarbon stream for further processing and utilization;

t) recycling a third stream (18D), an increased pressure stream (21) and a second process stream (7D) to upstream process for further processing and utilization.

In an embodiment of the present invention, the distillation column (DC) is operating in the pressure range of 20-50 bars and most preferably in the temperature range of 20-40 bars.

Still, in another embodiment of the present invention, the throttling device (TD) can be represented by throttling valve or expansion valve or similar device and the first pressure increasing device (K3) can be represented by a compressor or ejector using compressing process stream (6A). The first pressure increasing device (K3) may be with single-stage or multistage with inter stage cooling pressure increasing device.

Still, in another embodiment of the present invention, the second pressure increasing device (K4) can be represented by a compressor for compressing the 20C stream or ejector using compressing process stream (7D).

In another embodiment of the present invention, the crude helium stream (15), after its cold recovery in the cold utility generation system (CUGS), can be subjected to a purification system (PS) for producing the pure helium stream (15B) where purification system (PS) can be either membrane or pressure swing adsorption or vacuum swing adsorption or a combination of thereof.

In another embodiment of the present invention, the gas stream (13) from the top of distillation column (DC) is cooled in a fifth heat exchanger (E4) using either process cold streams (20A) and external refrigeration stream (ER2) in the temperature range of minus 150-minus 185° C. (FIG. 1) or process cold streams (20A) in the temperature range of minus 140-minus 165° C. (FIG. 2)

In another embodiment of the present invention, the external cold utility stream (ERIA) (FIG. 2) from (CUGS) is used in multiple stream third heat exchanger (E3) to achieve stream (12) temperature in the range of minus 80-minus 120° C.

In another embodiment of the present invention, the stream (20) pressure is reduced using the valve/expander (PV1) to a pressure range of 0.5-1.0 bars.

DETAILED DESCRIPTION OF THE INVENTION

Figure 1:
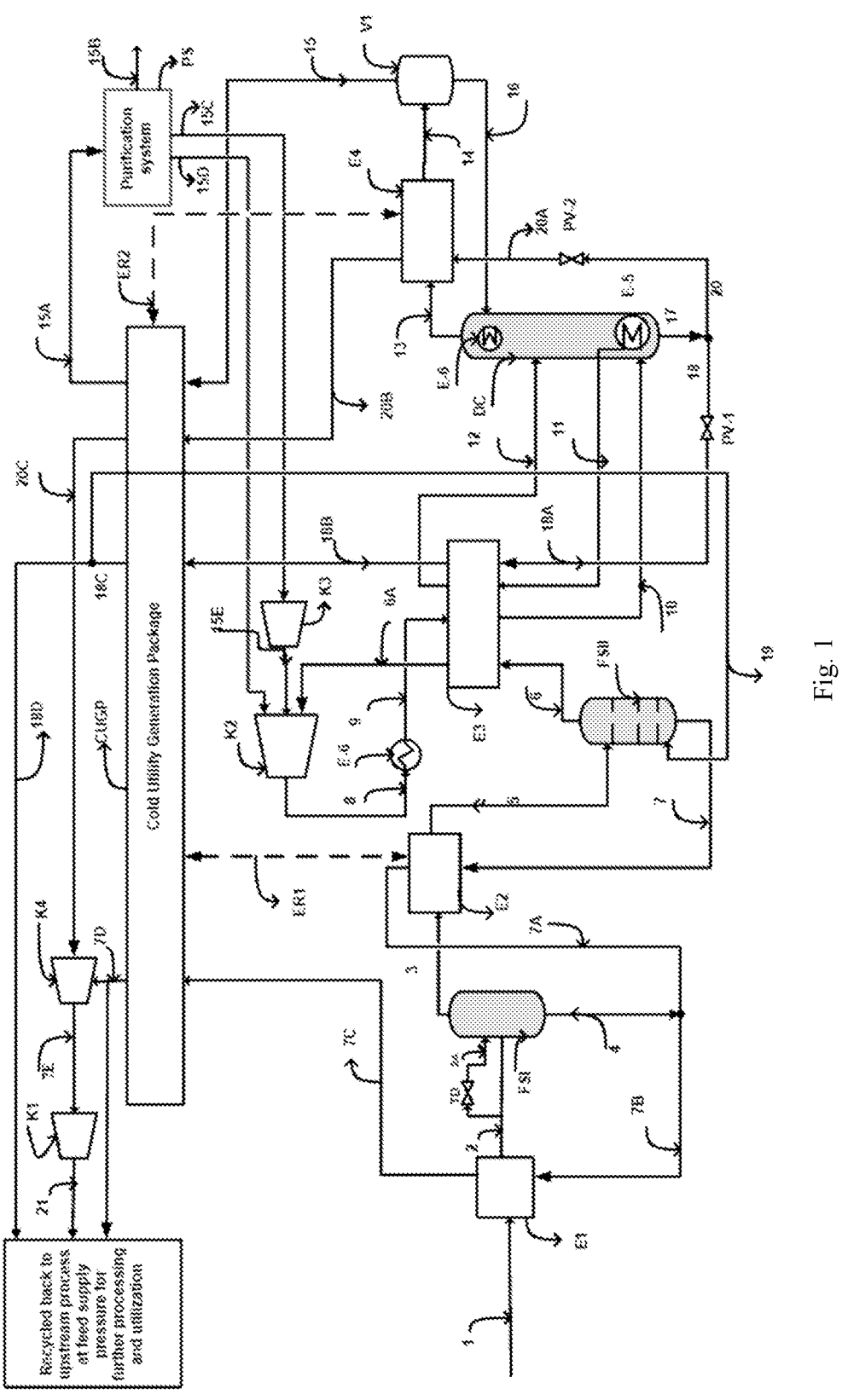
FIG. 1 is a systematic representation of a process scheme constructed in accordance with one of the embodiments of the present invention for helium recovery from pretreated natural gas to demonstrate the applicability of the present invention.

The foregoing detailed description of the disclosure is elaborated to provide a clear understanding to the person who is skilled in the art. Additional features, embodiments and advantages of the invention will be described hereinafter which form the subject of the claims of the disclosure, However, the set forth disclosure provide in the specification will best be understood in conjunction with the appended claims and figures as provide heretofore. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent processes do not depart from the spirit and scope of the disclosure as set forth in the appended claims. It will be readily understood that the aspects of the present disclosure, as generally described herein, and illustrated in the figures, can be arranged, substituted, combined, and designed in a wide variety of different configurations, all of which are explicitly contemplated and make part of this disclosure.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein. In line with the above objectives, present invention relates to a cryogenic process for natural gas to produce the crude helium with 100% helium recovery and to enhance helium recovery in a hybrid process consisting of a cryogenic process of the present invention and a known purification system to produce pure helium to overcome the disadvantages of prior art processes.

For the purpose of illustrating the invention, drawings constructed in accordance with the preferred embodiments of the present invention are conceptualized. The same numeral is used in drawings to refer to the same or similar stream, column, vessel, and other elements. It is important to note that invention is not limited to the precise arrangements of apparatus shown in drawings. The reference to FIGS. 1 and 2 are made to describe the present invention in detail.

Referring to FIG. 1, represents the cryogenic process constructed according to one of the embodiments of the present invention for crude helium recovery from pretreated natural gas and the proposed cryogenic process scheme's integration with the purification system to produce pure helium. The natural gas having pressure in the range of 1-20 bars is pretreated using the required processes at desired operating conditions to remove the CO2, water, $H_2S$ and water impurities for their desired level in pretreated natural gas (not shown in figure for simplicity). The Pretreated natural gas stream (1) consists of 80-98 mole % methane, 3-20 mole % methane plus hydrocarbon, 0.1-5.0 mole % nitrogen %, 0.01-0.5% mole % helium, 1-10 ppmv $H_2S$, 5-50 ppmv water is cooled in a first heat exchanger (E1) in the temperature range of minus 70-minus 140° C. 20. Depending upon the pressure more than 15 bars of pretreated gas, the cooled stream (2) from the first heat exchanger (E1) is either fed to throttling device (TD) to reduce its pressure and generating cold and stream 2A from TD is routed to the first flash stage (FSI) or the cooled stream (2) is directly routed to the first flash stage (FSI) for generating the uncondensed gas stream (3) and liquid stream (4). The gas stream (3) is cooled in a second heat exchanger (E2) using a cold process stream (7A) and external cold utility stream (ER1) from a cold utility generation system (CUGS) in the temperature range of minus 100-minus 150° C. The partially condensed gas stream (5) from the second heat exchanger (E2) is fed to a second flash stage (FSII), which has 2-6 trays below the feed entry location and use the helium free process stream (19) to strip out the helium from the FSII liquid falling from flash zone to the bottom of the second flash stage FSII. The gas stream (6) produced in the second flash state (FSII) is routed to a multi streams third heat exchanger (E3) for its heating. The heated stream (6A) along with the high-pressure purge stream (15D) having pressure in the range of 6-20 bars from the purification system (PS) to a first gas compressor (K2) for increasing the combined stream pressure in the range of 20-50 bars. The pressurized gas stream (8) emanating from the first gas compressor (K2) is fed to the water or air cooler (E6). Subsequently, the cooled gas stream (9) emanating from the water or air cooler (E6) is fed to the multi stream third heat exchanger (E3). The cooled stream (10) from the multi stream third heat exchanger (E3) is routed to a fourth heat exchanger E5 and a stream (11) from the fourth heat exchanger E5 is again routed to the multi stream third heat exchanger E3 for its cooling in the temperature range of minus −80-minus 140° C. A partially condensed gas stream (12) emanating from the multi stream third heat exchanger E3 is fed to a distillation column (DC), having multiple trays in its stripping and rectification sections, and having the process stream and/or external utility coils cooler (EC-6) inside the distillation column DC overhead to generate the in situ liquid for rectification section and/or having reflux stream (16) at the top tray. A gas stream (13) emanating from the top of the distillation column DC is cooled in a fifth heat exchanger (E4) using process cold stream (20A) and an external refrigeration stream (ER2). A partially condensed gas stream (14) from the fifth heat exchanger (E4) is fed to a separating vessel (V1) for generating the crude helium stream (15) having helium concentration in the range of 50-75 mole % and liquid stream (16), which is used as reflux in the distillation column (DC). The crude helium stream (15) is routed to a purification section that may consist of pressure swing adsorption, or vacuum pressure swing adsorption or membrane or a combination of thereof. The purification section generates the pure helium stream (15B) and low-pressure purge stream (15C), and/or high-pressure purge stream (15D). The low-pressure purge stream (15C), having pressure in the range of 1-10 bars from the purification section, is routed to a first pressure increasing device (K3) to produce the increased pressure stream (15E), which is further routed to the first gas compressor (K.2) The first pressure increasing device (K3) shall be represented by either compressor or ejector using the high-pressure process stream. The high pressure purge stream (15D) having to pressure in the range of 7-20 bars from the purification section is directly routed to the first gas compressor (K2).

A bottom liquid stream (17) emanating from distillation column DC is divided into two streams 18 and 20. The stream 18 is routed to a first throttling valve/expender (PV1) to generate low-pressure stream 18A, which is routed to the third exchanger E3 for its cold recovery. The stream 20 is routed to a second throttling valve/expander (PV2) to generate a low-pressure stream 20A which is routed to the fifth exchanger E4 for its cold recovery. The liquid stream (4) from the first flash stage FS1 and stream (7A) from the second heat exchanger (E2) are mixed to form a stream (7B), which is routed to the first heat exchanger (E1) for recovering its cold by cooling the feed stream (1). A stream 7C from the first heat exchanger (E1), a stream 18B from the third heat exchanger (E3), and a stream 20B from the fifth heat exchanger (E4) are routed to the cold utility generation system (CUGS) for recovering their cold and reducing the CAPEX and OPEX of the cold utility generation system CUGS. A first stream 20C from the cold utility generating system CUGS is routed to a second pressure increasing device (K4). The second pressure increasing device (K4) can be represented by either compressor or ejector using a second process stream (7D) from the cold utility generation system CUGS. The compressed stream (7E) from the second pressure increasing device K4 is routed to a second compressor (K1) for increasing the pressure to the required value for recycling hydrocarbon first stream (20C) which has been increased in pressure into an increased pressure steam (21) by the second compressor (K1) for further processing and utilization. A third stream 18D and the second process steam 7D, both from the cold utility generation system CUGS, can also be recycled to the upstream process for further processing and utilization with or without compression.

Figure 2:
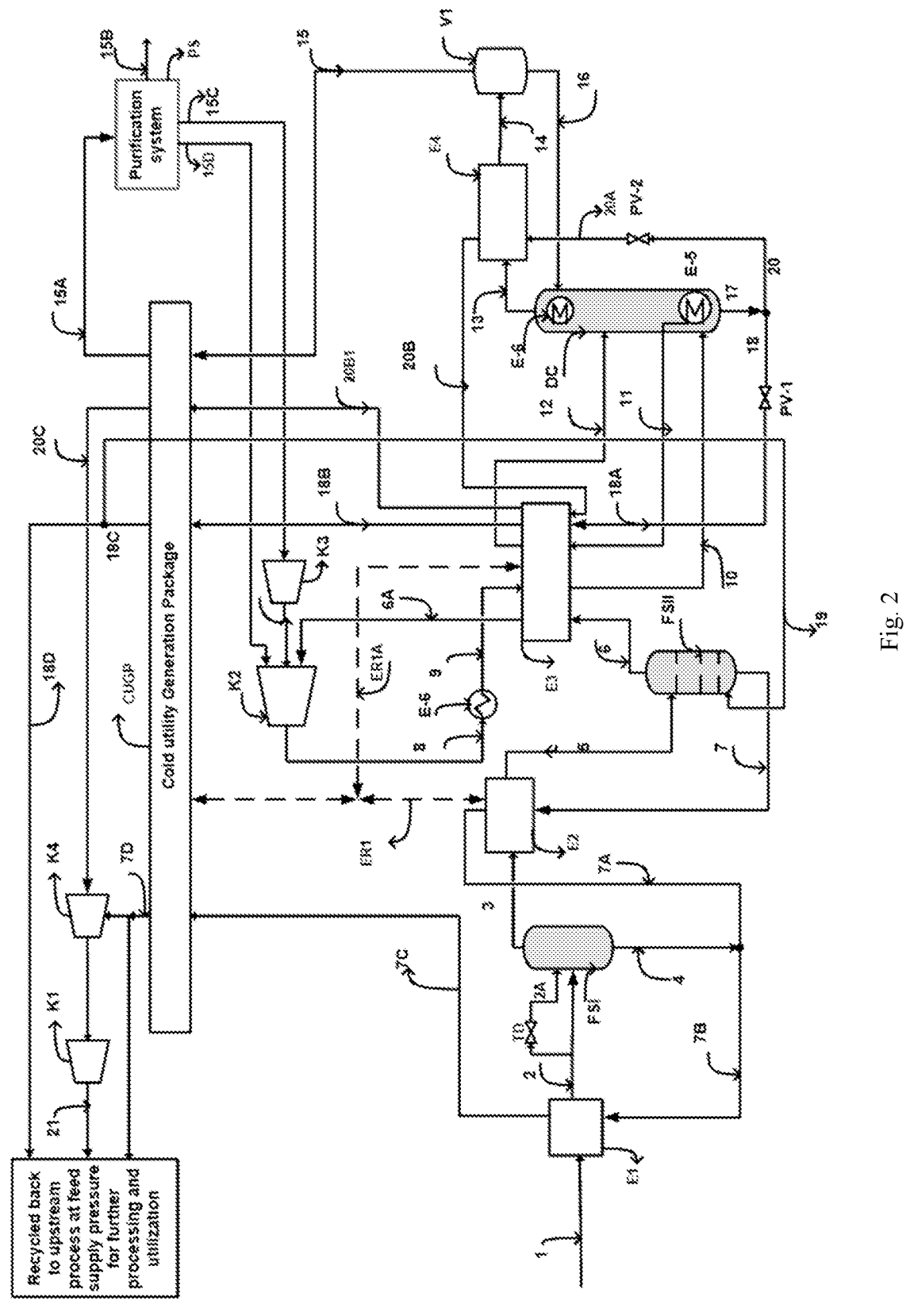
FIG. 2 is a systematic representation of another variation of the process scheme, described in FIG. 1, constructed in accordance with one of the embodiments of the present invention for helium recovery from pretreated natural gas to demonstrate the applicability of the present invention.

Referring to FIG. 2, representing a cryogenic process, constructed in accordance with one of the embodiments of the present invention for crude helium recovery from pretreated natural gas and integration of the proposed cryogenic process scheme with a purification system to produce pure helium to demonstrate the applicability and benefits of the present invention. The process description for an element having the same numbering in FIG. 2 is the same as given in the description of FIG. 1. In this scheme, the stream (20) pressure is reduced using the valve/expander (PV1) to a pressure range of 0.5-1.0 bars. The pressure reduction of the stream (20) leads to its cooling. The cold stream (20A) first exchanges its cold in a heat exchanger (E4) to partially condense the stream (13). The partially condensed stream (14) is routed to phases separating vessel (V1) to generate the crude helium with a helium concentration of 30-40 mole %. The crude helium is processed in the purification section as described in FIG. 1. The stream (20B) is routed to Exchanger (E4) for its cold recovery before its routing to CUGS as stream (20B1). The external cold utility stream (ER1B) is used in a heat exchanger (E3) for achieving the stream (12) temperature in the range of minus 80-minus 140° C.

In most cryogenic processes, crude helium from nitrogen and methane-rich natural gas is produced as one of the products, along with liquefied natural gas (LNG) and fuel gas. The existing cryogenic processes are mostly designed to process high-pressure natural gas helium resources. There is a significant increase in the price and demand of helium with time, whereas helium resources are limited. The low-pressure natural gas resources containing a small concentration of helium (0.02-0.50%) and nitrogen (0.1-5.0%) are also now getting attention to recover the helium. Thus, there is a need for helium recovery from all kinds of natural gas resources containing helium. The cryogenic processing schemes used for crude helium recovery from the high-pressure natural gas use high pressure of natural gas to generate cold in the process itself using throttling through a valve or expander. Thus, applying these schemes for crude helium recovery from low-pressure natural gas will require compression of the total natural gas feed stream to high pressure. This will result in huge compression duty and capital cost requirements for helium recovery from low-pressure natural gas using the process developed for high-pressure natural gas. Moreover, high pressure and low-temperature conditions used in hydrocarbon and nitrogen rejection separation stages in high-pressure cryogenic processes lead to the dissolution of helium in product streams other than crude helium and results in helium loss which is undesirable in the context of helium's high price and limited resources availability. It is also observed that the crude helium produced from cryogenic processes contains more than two components, typically three components i.e. helium, nitrogen, and methane. Moreover, the cold generation using the feed stream expansion in these processes also generates a low-pressure fuel gas and other product streams, which need to be further compressed in case of high pressure of their further processing and utilization destinations.

Moreover, the person skilled in the art understand that the feed to the purification process will be around 0.25-1.0% of the total feed to cryogenic process depending upon the helium concentration in feed and crude helium generated in the cryogenic process. This implies that the process economics of a cryogenic integrated hybrid process to produce pure helium will be mostly governed by the crude helium production process economics. Therefore, it seems very important to develop an energy and capital-efficient cryogenic process which can provide maximum helium recovery, use minimum compression energy and cost for feed and product streams, produce binary components bearing crude helium to simplify the design of purification system for developing a hybrid process to make the production of pure helium from natural gas having low pressure and very low helium concentration feasible in a cost-effective manner.

The novelty of the present invention resides in developing an innovative processing scheme of a cryogenic process to produce the crude helium with 100% helium recovery and to provide more than 99% helium recovery in a hybrid process consisting of a cryogenic process of the present invention and a known purification system to produce pure helium production to overcome the disadvantages of prior art processes. Further, the proposed cryogenic process in the present invention involves the compression of 4-8% of the feed to high pressure in the pressure range of 20-50 bars against the total feed gas compression requirement in the cryogenic processes developed for the high-pressure feed stream. The pressure loss between the supply feed to the process and products discharged from the process for further use is also significantly lower in the cryogenic process of the present invention compared to the cryogenic developed for high-pressure feed stream with feed stream throttling. Thus, the cryogenic process of the present invention has an opportunity to minimize the overall compression energy and cost to produce crude helium. The lower operating pressure in the first separation stage (FSI) and lower operating pressure and the use of helium free process stripping steams in the second separation stage (FSII) in the cryogenic process of the present invention ensure the 100% helium recovery in crude helium stream. The low operating pressure in most of the pieces of equipment for the cryogenic process of the present invention provides an opportunity to reduce the process's equipment capital cost. The recycling of high and low-pressure purge streams from the purification system to the cryogenic process at a location matching with process pressure profile ensures the high (>99%) recovery of helium in the hybrid process consisting of the cryogenic process of the present invention.

EXAMPLES

The following two examples are given by way of illustration to substantiate the invention and, therefore, should not be construed to limit the scope of the invention. The properties of natural gas used in illustrative examples are given in Table 1. The embodiments of the present invention were simulated by using computational means.

TABLE 1

| S. No. | Component Name | Mole % |
|--------|---------------|--------|
| Composition of pretreated natural gas. | | |
| 1 | Methane | 86.75 |
| 2 | Ethane | 7.00 |
| 3 | Propane | 3.00 |
| 4 | i-Butane | 0.6 |
| 5 | n-Butane | 1.0 |
| 6 | i-Pentane | 0.20 |
| 7 | n-Pentane | 0.20 |
| 8 | n-Hexane | 0.20 |
| 9 | Nitrogen | 1.00 |
| 10 | Helium | 0.050 |

Examples

The following examples, which include preferred embodiments, will serve to illustrate the practice of this invention, it being understood that the particulars shown are by way of example and for purpose of illustrative discussion of preferred embodiments of the invention.

Example 1: This example is constructed in accordance with an embodiment of the present invention substantially as illustrated in FIG. 1 to illustrate the process capability to generate the crude helium with helium content of 50-75 mol % which can be purify using the known purifying system and helium free hydrocarbon streams from natural gas. Process conditions, mole and mass balances of key streams of this embodiment are given in Table 2.

TABLE 2

| Name | 1 | 2 | 5 | 6A | 8 | 9 | 12 | 15 | 15B |
|------|-----|-----|-----|-----|-----|-----|-----|-----|-----|
| Process conditions, mole and mass balances of key streams. | | | | | | | | | |
| Vapour Fraction | 1.00 | 0.40 | 0.10 | 1.00 | 1.00 | 1.00 | 0.20 | 1.00 | 1.00 |
| Temperature [C.] | 35.00 | −127.00 | −134.35 | 10.00 | 108.06 | 55.00 | −114.94 | −177.46 | 30.38 |

TABLE 2-continued

Process conditions, mole and mass balances of key streams.

| | | | | | | | | |
|---|---|---|---|---|---|---|---|---|
| Pressure [kg/cm2] | 7.50 | 7.40 | 7.00 | 6.80 | 25.50 | 25.30 | 25.00 | 24.20 | 23.80 |
| Molar Flow [kgmole/h] | 33.46 | 33.46 | 13.31 | 1.83 | 1.86 | 1.86 | 1.86 | 0.05 | 0.02 |
| Mass Flow [kg/h] | 636.35 | 636.35 | 217.35 | 31.55 | 32.02 | 32.02 | 32.02 | 0.53 | 0.07 |

| Mole fraction | | 2 | 5 | 6A | 8.00 | 9 | 12 | 15 | 15B |
|---|---|---|---|---|---|---|---|---|---|
| Methane | 0.86750 | 0.86750 | 0.97423 | 0.88283 | 0.87 | 0.86812 | 0.86812 | 0.00000 | 0.00000 |
| Ethane | 0.07000 | 0.07000 | 0.00193 | 0.00003 | 0.00 | 0.00003 | 0.00003 | 0.00000 | 0.00000 |
| Propane | 0.03000 | 0.03000 | 0.00003 | 0.00000 | 0.00 | 0.00000 | 0.00000 | 0.00000 | 0.00000 |
| i-Butane | 0.00600 | 0.00600 | 0.00000 | 0.00000 | 0.00 | 0.00000 | 0.00000 | 0.00000 | 0.00000 |
| n-Butane | 0.01000 | 0.01000 | 0.00000 | 0.00000 | 0.00 | 0.00000 | 0.00000 | 0.00000 | 0.00000 |
| i-Pentane | 0.00200 | 0.00200 | 0.00000 | 0.00000 | 0.00 | 0.00000 | 0.00000 | 0.00000 | 0.00000 |
| n-Pentane | 0.00200 | 0.00200 | 0.00000 | 0.00000 | 0.00 | 0.00000 | 0.00000 | 0.00000 | 0.00000 |
| n-Hexane | 0.00200 | 0.00200 | 0.00000 | 0.00000 | 0.00 | 0.00000 | 0.00000 | 0.00000 | 0.00000 |
| Nitrogen | 0.01000 | 0.01000 | 0.02255 | 0.10802 | 0.11 | 0.11391 | 0.11391 | 0.30000 | 0.00001 |
| Helium | 0.00050 | 0.00050 | 0.00125 | 0.00912 | 0.02 | 0.01794 | 0.01794 | 0.70000 | 0.99999 |

| | 15C | 18 | 18D | 19 | 20 | 20A | 20B | 20C | 21 |
|---|---|---|---|---|---|---|---|---|---|
| Name | | | | | | | | | |
| Vapour Fraction | 1.00 | 0.00 | 1.00 | 1.00 | 0.00 | 0.42 | 0.69 | 1.00 | 1.00 |
| Temperature [C.] | 30.38 | −114.43 | 25.00 | 25.00 | −114.43 | −162.01 | −161.20 | 25.00 | 62.86 |
| Pressure [kg/cm2] | 1.10 | 24.80 | 8.30 | 8.30 | 24.80 | 1.30 | 1.25 | 1.20 | 8.00 |
| Molar Flow [kgmole/h] | 0.03 | 1.40 | 1.10 | 0.30 | 0.41 | 0.41 | 0.41 | 0.41 | 32.41 |
| Mass Flow [kg/h] | 0.47 | 24.37 | 19.17 | 5.20 | 7.11 | 7.11 | 7.11 | 7.11 | 618.34 |
| Mole fraction | | | | | | | | | |
| Methane | 0.00000 | 0.89096 | 0.89096 | 0.89096 | 0.89096 | 0.89096 | 0.89096 | 0.89096 | 0.86724 |
| Ethane | 0.00000 | 0.00003 | 0.00003 | 0.00003 | 0.00003 | 0.00003 | 0.00003 | 0.00003 | 0.07227 |
| Propane | 0.00000 | 0.00000 | 0.00000 | 0.00000 | 0.00000 | 0.00000 | 0.00000 | 0.00000 | 0.03097 |
| i-Butane | 0.00000 | 0.00000 | 0.00000 | 0.00000 | 0.00000 | 0.00000 | 0.00000 | 0.00000 | 0.00619 |
| n-Butane | 0.00000 | 0.00000 | 0.00000 | 0.00000 | 0.00000 | 0.00000 | 0.00000 | 0.00000 | 0.01032 |
| i-Pentane | 0.00000 | 0.00000 | 0.00000 | 0.00000 | 0.00000 | 0.00000 | 0.00000 | 0.00000 | 0.00206 |
| n-Pentane | 0.00000 | 0.00000 | 0.00000 | 0.00000 | 0.00000 | 0.00000 | 0.00000 | 0.00000 | 0.00206 |
| n-Hexane | 0.00000 | 0.00000 | 0.00000 | 0.00000 | 0.00000 | 0.00000 | 0.00000 | 0.00000 | 0.00206 |
| Nitrogen | 0.46154 | 0.10902 | 0.10902 | 0.10902 | 0.10902 | 0.10902 | 0.10902 | 0.10902 | 0.00680 |
| Helium | 0.53846 | 0.00000 | 0.00000 | 0.00000 | 0.00000 | 0.00000 | 0.00000 | 0.00000 | 0.00000 |

The purifying system to produce the pure helium with 50% helium recovery is used in the simulation of the scheme. It shall be noted that there is no helium present in the hydrocarbon byproduct streams (21 and 18D) from the process. This ensures the 100% recovery of helium from natural gas into crude helium. Moreover, the hybrid system based on the cryogenic process of the present invention will ensure the maximum helium recovery except for some helium loss in normally not flow gas purge streams from the purification system. There is a need for 22813.5 watts of external cold utility (ER1) at a temperature of minus 137° C. and 638.1 watts of external cold utility (ER21) at a temperature of minus 180° C. in the process scheme given in FIG. 1 to produce the crude helium having helium concentration of 70%.

Example 2: This example is constructed in accordance with an embodiment of the present invention substantially as illustrated in FIG. 2 to illustrate the process capability to generate the crude helium with helium content of 30-40 mol % and helium free hydrocarbon streams from natural gas to eliminate the requirement of cold utility at higher minus temperature. Process conditions, mole and mass balances of key streams of this embodiment are given in Table 3.

| | 1 | 2 | 5 | 6A | 8 | 9 | 12 | 15 | 15B |
|---|---|---|---|---|---|---|---|---|---|
| Name | | | | | | | | | |
| Vapour Fraction | 1.00 | 0.40 | 0.10 | 1.00 | 1.00 | 1.00 | 0.15 | 1.00 | 1.00 |
| Temperature [C.] | 35.00 | −127.00 | −134.35 | 10.00 | 126.13 | 55.00 | −114.16 | −162.83 | 30.62 |
| Pressure [kg/cm2] | 7.50 | 7.40 | 7.00 | 6.80 | 30.00 | 29.80 | 29.50 | 29.00 | 23.80 |
| Molar Flow [kgmole/h] | 33.46 | 33.46 | 13.31 | 1.83 | 1.91 | 1.91 | 1.91 | 0.10 | 0.02 |
| Mass Flow [kg/h] | 636.35 | 636.35 | 217.35 | 31.55 | 33.36 | 33.36 | 33.36 | 1.87 | 0.07 |
| Mole fraction | | | | | | | | | |
| Methane | 0.8675 | 0.8675 | 0.9742 | 0.8828 | 0.8465 | 0.8465 | 0.8465 | 0.0000 | 0.0000 |
| Ethane | 0.0700 | 0.0700 | 0.0019 | 0.0000 | 0.0000 | 0.0000 | 0.0000 | 0.0000 | 0.0000 |
| Propane | 0.0300 | 0.0300 | 0.0000 | 0.0000 | 0.0000 | 0.0000 | 0.0000 | 0.0000 | 0.0000 |
| i-Butane | 0.0060 | 0.0060 | 0.0000 | 0.0000 | 0.0000 | 0.0000 | 0.0000 | 0.0000 | 0.0000 |
| n-Butane | 0.0100 | 0.0100 | 0.0000 | 0.0000 | 0.0000 | 0.0000 | 0.0000 | 0.0000 | 0.0000 |
| i-Pentane | 0.0020 | 0.0020 | 0.0000 | 0.0000 | 0.0000 | 0.0000 | 0.0000 | 0.0000 | 0.0000 |
| n-Pentane | 0.0020 | 0.0020 | 0.0000 | 0.0000 | 0.0000 | 0.0000 | 0.0000 | 0.0000 | 0.0000 |
| n-Hexane | 0.0020 | 0.0020 | 0.0000 | 0.0000 | 0.0000 | 0.0000 | 0.0000 | 0.0000 | 0.0000 |
| Nitrogen | 0.0100 | 0.0100 | 0.0226 | 0.1080 | 0.1360 | 0.1360 | 0.1360 | 0.6500 | 0.0000 |

-continued

| | | | | | | | | |
|---|---|---|---|---|---|---|---|---|
| Helium | 0.0005 | 0.0005 | 0.0013 | 0.0091 | 0.0175 | 0.0175 | 0.0175 | 0.3500 | 1.0000 |

| | 15C | 18 | 18D | 19 | 20 | 20A | 20B | 20C | 21 |
|---|---|---|---|---|---|---|---|---|---|
| Name | | | | | | | | | |
| Vapour Fraction | 1.00 | 0.00 | 1.00 | 1.00 | 0.00 | 0.50 | 0.96 | 1.00 | 1.00 |
| Temperature [C.] | 30.62 | −108.99 | 25.00 | 25.00 | −108.99 | −165.22 | −164.51 | 25.00 | 67.58 |
| Pressure [kg/cm2] | 1.1 | 29.30 | 8.30 | 8.30 | 29.30 | 0.95 | 0.90 | 0.85 | 8.00 |
| Molar Flow [kgmole/h] | 0.08 | 0.71 | 0.41 | 0.30 | 1.10 | 1.10 | 1.10 | 1.10 | 33.10 |
| Mass Flow [kg/h] | 1.80 | 12.40 | 7.20 | 5.20 | 19.08 | 19.08 | 19.08 | 19.08 | 630.31 |
| Mole fraction | | | | | | | | | |
| Methane | 0.0000 | 0.8910 | 0.8910 | 0.8910 | 0.8910 | 0.8910 | 0.8910 | 0.8910 | 0.8677 |
| Ethane | 0.0000 | 0.0000 | 0.0000 | 0.0000 | 0.0000 | 0.0000 | 0.0000 | 0.0000 | 0.0708 |
| Propane | 0.0000 | 0.0000 | 0.0000 | 0.0000 | 0.0000 | 0.0000 | 0.0000 | 0.0000 | 0.0303 |
| i-Butane | 0.0000 | 0.0000 | 0.0000 | 0.0000 | 0.0000 | 0.0000 | 0.0000 | 0.0000 | 0.0061 |
| n-Butane | 0.0000 | 0.0000 | 0.0000 | 0.0000 | 0.0000 | 0.0000 | 0.0000 | 0.0000 | 0.0101 |
| i-Pentane | 0.0000 | 0.0000 | 0.0000 | 0.0000 | 0.0000 | 0.0000 | 0.0000 | 0.0000 | 0.0020 |
| n-Pentane | 0.0000 | 0.0000 | 0.0000 | 0.0000 | 0.0000 | 0.0000 | 0.0000 | 0.0000 | 0.0020 |
| n-Hexane | 0.0000 | 0.0000 | 0.0000 | 0.0000 | 0.0000 | 0.0000 | 0.0000 | 0.0000 | 0.0020 |
| Nitrogen | 0.7879 | 0.1090 | 0.1090 | 0.1090 | 0.1090 | 0.1090 | 0.1090 | 0.1090 | 0.0089 |
| Helium | 0.2121 | 0.0000 | 0.0000 | 0.0000 | 0.0000 | 0.0000 | 0.0000 | 0.0000 | 0.0000 |

The purifying system to produce the pure helium with 50% helium recovery from crude helium is used in the simulation of the scheme given in FIG. 2. It shall be noted that there is no helium present in the hydrocarbon byproduct streams (21 and 18D) from the process. This ensures the 100% recovery of helium from natural gas into crude helium. Moreover, the hybrid system based on the cryogenic process of the present invention will ensure the maximum helium recovery except for the helium loss in normally not flow purge streams from the purification system. There is a need for 22813.5 watts external cold utility (ER1) at a temperature of minus 137° C. and 913.8 watts external cold utility (ER1A) at a temperature of minus 117° C. in the process scheme given in FIG. 2 to produce the crude helium having helium concentration of 35%.

The comparative analysis of process schemes given in FIG. 1 and FIG. 2 indicates that the process scheme of FIG. 2 does not need a very low temperature (minus 180° C.) external cold utility, which can result in a reduced cost of the external cold utility generation system. However, the lower helium purity (35% compared to 70%) of crude helium will also affect the purification system's performance, size, and energy requirement to produce pure helium.

Advantages of Invention:

The several advantages of the present process are:—

The process provides 100% helium recovery from natural gas to produce crude helium.

The hybrid process based on the cryogenic process of the present invention ensures high overall helium recovery to produce pure helium.

The cryogenic process of the present invention needs compression of 4-8% of the natural gas feed to high pressure using the multistage compression against the total feed gas compression requirement for cryogenic processes developed for high-pressure natural gas feed stream. Moreover, the pressure drop between the feed stream and product streams consisting of most of the hydrocarbons is much lower than reported in cryogenic processes developed for high-pressure natural gas feed streams. Thus the process of the present invention has an opportunity to minimize the overall compression energy and cost to produce crude helium.

Lower operating pressure in most of the pieces of equipment of the cryogenic process of the present invention may provide the opportunity to reduce the process's equipment capital cost.

Lower GHG emissions to the environment will help to make helium recovery from natural gas cleaner and greener.

We claim:

1. A cryogenic process to produce crude helium from pretreated natural gas consisting of 80-98 mole % methane, 3-20 mole % methane plus hydrocarbon, 0.1-5.0 mole % nitrogen %, 0.01-0.5% mole % helium, 1-10 ppmv H2S, 5-50 ppmv water, wherein said process comprising the steps of:

a) subjecting the pretreated natural gas (1) to a first cooler (E1) for its cooling in the temperature range of minus 85-minus 140° C.;

b) subjecting a partially condensed gas (2) to a throttling device (TD) to reduce its pressure and generating cold and routing a stream (2A) from the (TD) to a first flash stage (FSI) or the partially condensed gas (2) direct routing to the first flash stage (FSI) for generating an uncondensed gas stream (3) and a liquid stream (4);

c) subjecting the uncondensed gas stream (3) for its cooling in a second heat exchanger (E2), which uses a cold process liquid stream (7) and external cold utility (ER1) in the temperature range of minus 100-minus 150° C.;

d) subjecting a second partially condensed gas stream (5) to a second flash stage (FSII), which has 2-6 trays below a feed entry location and use a helium free stripping stream (19) to generate in the second flash stage (FSII) a gas stream (6) and the cold process liquid stream (7);

e) subjecting the gas stream (6) to a multi stream third heat exchanger (E3) for its heating;

f) subjecting a heated gas stream (6A) along a high-pressure purge stream (15D) having a pressure in the range of 6-20 bars from a purification system (PS) to a gas compressor (K2) for increasing combined streams pressure in the range of 20-50 bars;

g) subjecting a pressurized gas stream (8) emanating from the gas compressor (K2) to a water or air cooler (E6), subsequently cooling of a gas stream (9) emanating from the water or air cooler (E6) is fed to the multi stream third heat exchanger (E3) using either process cold streams or both process cold stream and external utility, cooling of a stream (10) in a fourth heat exchanger (E5) and then a stream (11) from the fourth heat exchanger (E5) is again routed to the multi-stream heat third exchanger (E3) for its cooling and producing a partially condensed stream (12) having a temperature in the range of minus 85-minus 140° C.;

h) subjecting the partially condensed gas stream (12) emanating from the multi-stream third heat exchanger (E3) to a distillation column (DC) having multiple trays in its stripping and rectification sections and having the process stream and/or external utility coils cooler (E6) inside the distillation column (DC) overhead section to generate an in situ liquid for a rectification section;

i) cooling a gas stream (13) emanating from the distillation column (DC) in a fifth heat exchanger (E4) for its partial condensation;

j) subjecting a cooled gas stream (14) emanating from the fifth heat exchanger (E4) to a separating vessel (V1) for generating the crude helium (15) and the reflux liquid stream (16) used as a reflux stream in a top section of the distillation column (DC);

k) recycling a low pressure purge stream (15C) having a pressure in the range of 1-10 bars from the purification system to a first pressure increasing device (K3) to produce an increased pressure stream (15E), which is further routed to a gas compressor (K2);

l) Recycling a high pressure purge stream (15D) having pressure in the range of 8-20 bars from the purification system to the gas compressor (K2);

m) splitting the distillation column (DC) bottom liquid stream (17) into two streams (18) and (20);

n) subjecting the stream (18) to a throttling valve/expander (PV1) to generate a low-pressure stream (18A), which is routed to the multi stream third heat exchanger (E3) for its cold recovery;

o) Subjecting the stream (20) to a throttling valve/expander (PV2) to generate a low-pressure stream (20A), which is routed to a fifth heat exchanger (E4) for its cold recovery;

p) subjecting a stream (20B) either to a cold utility generation system or to the multi stream third heat exchanger (E3) for its cold recovery;

q) subjecting a stream (7C), stream (18B), stream (20B) or (20B1) to a cold utility generation system (CUGS) for recovering their cold;

r) subjecting a stream (20C) to a second pressure increasing device (K4) with or without a stream (7D);

s) subjecting a stream (7E) from the second pressure increasing device (K4) to a second gas compressor (K1) for recycling the hydrocarbon stream for further processing and utilization;

t) recycling third stream (18D), increased pressure stream (21), and second process stream (7D) to upstream process for further processing and utilization.

2. The process as claimed in claim 1, wherein the methane plus hydrocarbon is selected from ethane, propane, butane, isobutene, pentane, iso-pentane and hexane in any proportion.

3. The process as claimed in claim 1, wherein the distillation column (DC) is operating, preferably in the pressure range of 20-50 bars and most preferably in the temperature range of 20-40 bars.

4. The process as claimed in claim 1, wherein in another embodiment of the present invention, the throttling device (TD) is represented by throttling valve or expansion valve or similar device and the first pressure increasing device (K3) is represented by a compressor or ejector using compressing process stream (6A), wherein the first pressure increasing device (K3) may be single-stage or multistage with inter stage cooling.

5. The process as claimed in claim 1, wherein the second pressure increasing device (K4) is represented by a compressor for compressing the stream (20C) or ejector using compressing process stream (7D).

6. The process as claimed in claim 1, wherein the crude helium stream (15) after its cold recovery in the cold utility generation system (CUGS) is subjected to a known purification system (PS) for producing the pure helium stream (15B).

7. The process as claimed in claim 6, wherein the purification system (PS) is either membranes or pressure swing adsorption or vacuum swing adsorption or a combination of thereof.

8. The process as claimed in claim 1, wherein the gas stream (13) from the top of distillation column (DC) is cooled in the fifth heat exchanger (E4) using either process cold streams (20A) and external refrigeration stream (ER2) in the temperature range of minus 150-minus 185° C. or process cold streams (20A) in the temperature range of minus 140-minus 165° C.

9. The process as claimed in claim 1, wherein stream (20B) is subjected to the multi stream third heat exchanger (E3) for its cold recovery prior to its routing to the (CUGS).

10. The process as claimed in claim 1, wherein external cold utility stream (ER1A) (FIG. 2) from the (CUGS) is used in the multi stream third heat exchanger (E3) to reduce stream (12) temperature in the range of minus 85-minus 120° C.

\* \* \* \* \*